Aug. 7, 1962 W. H. COMERFORD, JR., ETAL 3,048,758
INVERSER TIMER MOTOR CONTROL
Filed Feb. 29, 1960 4 Sheets-Sheet 1
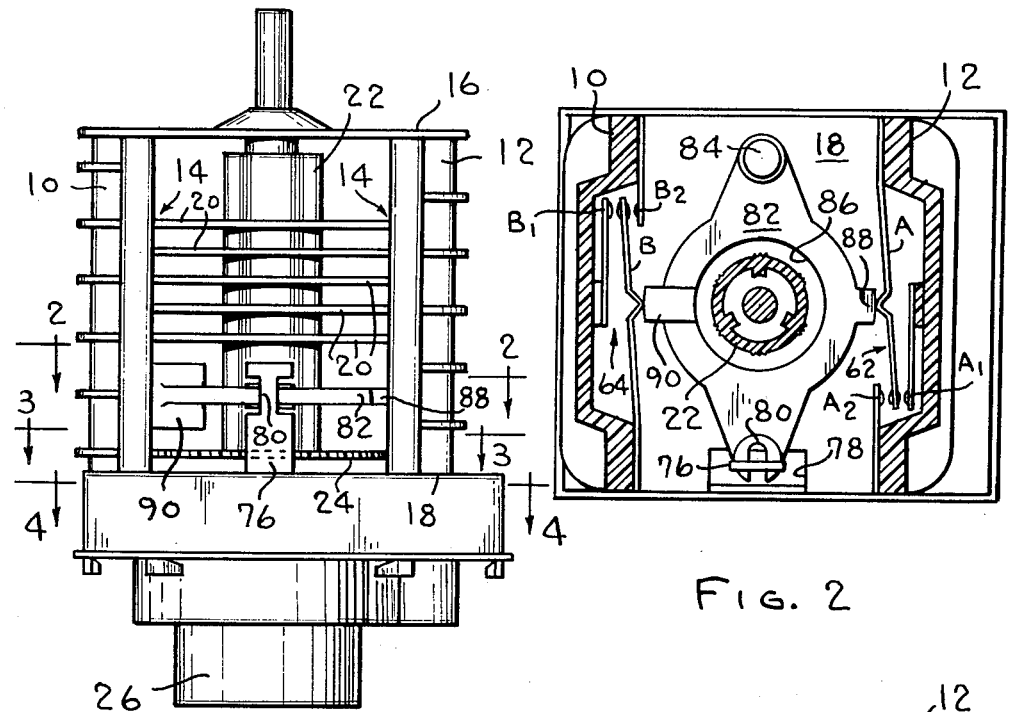
FIG. 1
FIG. 2
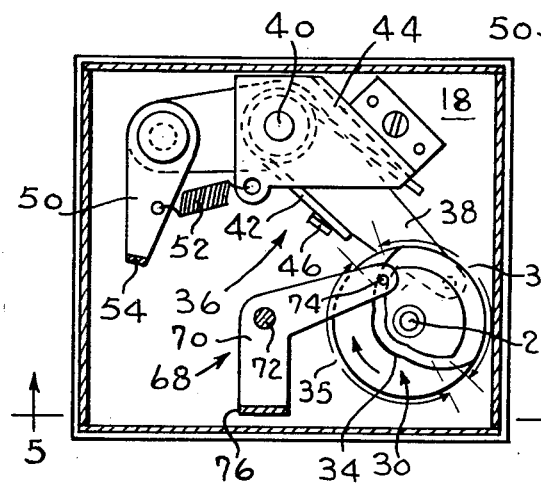
FIG. 4
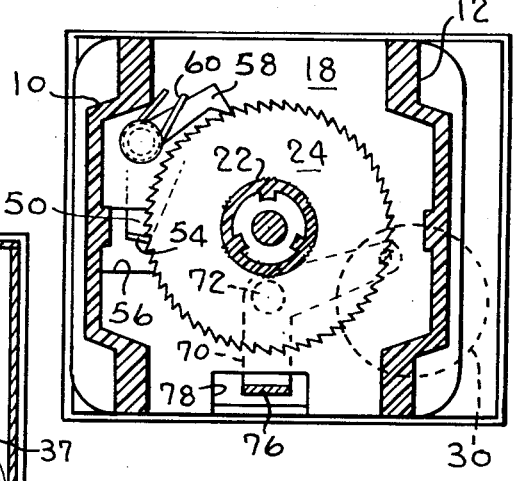
FIG. 3
INVENTORS
WILLIAM H. COMERFORD, JR.
HARRY S. TICE, JR.
BY
Bayard D. Michael
ATTORNEY

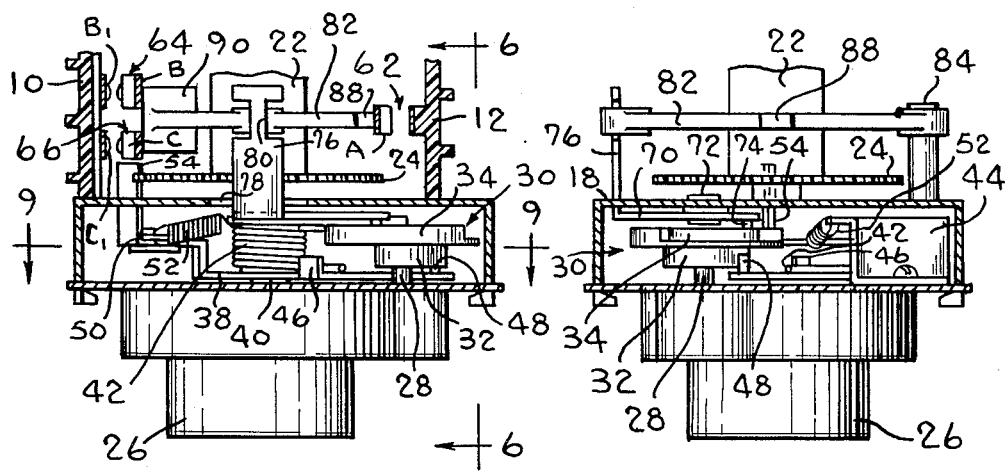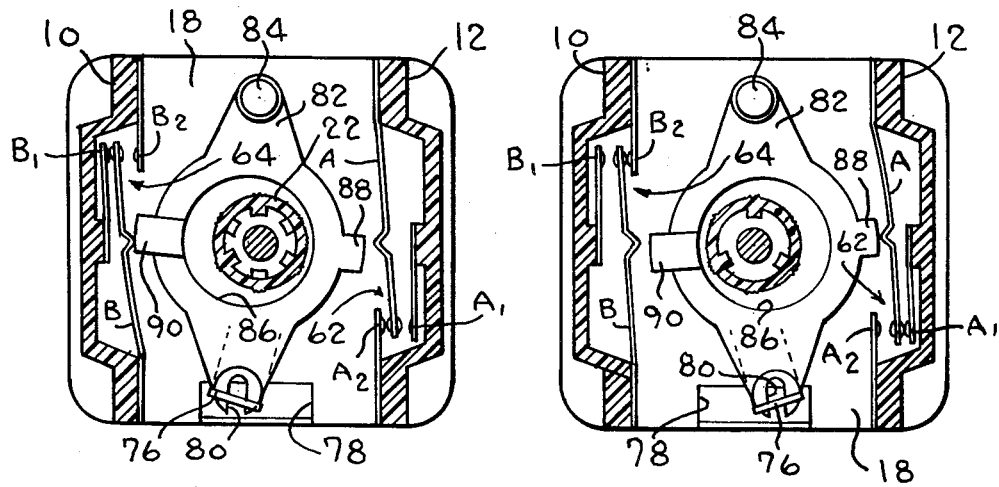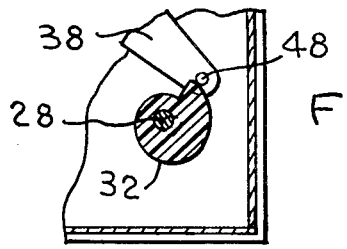

INVENTORS
WILLIAM H. COMERFORD, JR.
HARRY S. TICE, JR.
BY Bayard H. Michael
ATTORNEY Aug. 7, 1962 W. H. COMERFORD, JR., ETAL 3,048,758
INVERSER TIMER MOTOR CONTROL
Filed Feb. 29, 1960 4 Sheets-Sheet 4
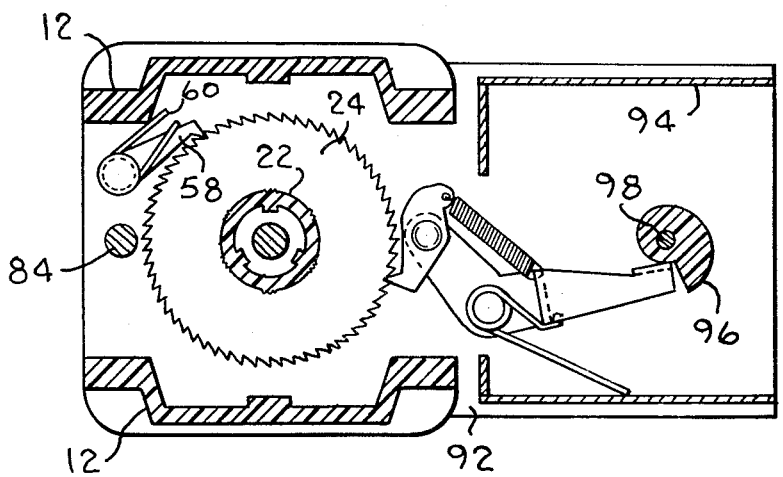
FIG. 12
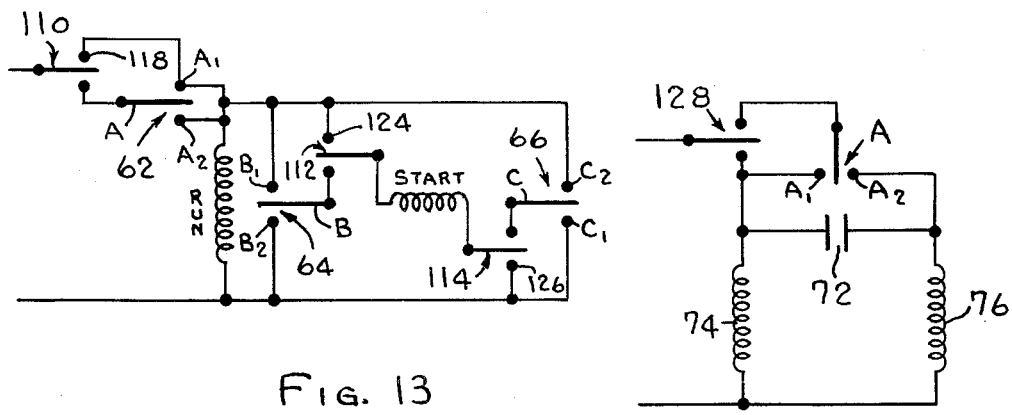
FIG. 13
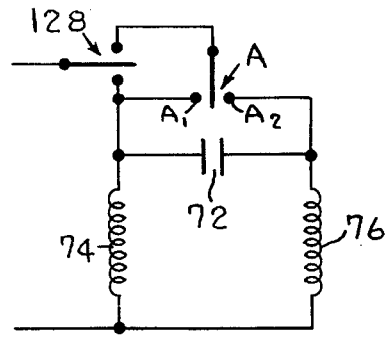
FIG. 14
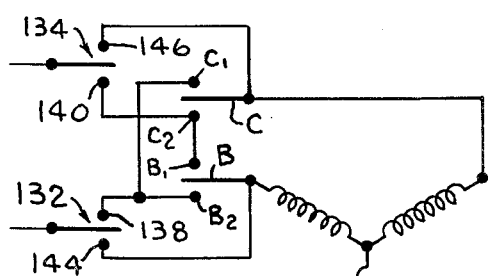
FIG. 15
INVENTORS
WILLIAM H. COMERFORD, JR.
HARRY S. TICE, JR.
BY
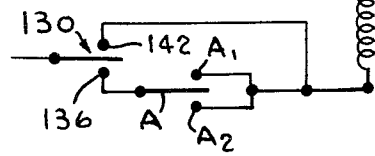
ATTORNEY

United States Patent Office 3,048,758
Patented Aug. 7, 1962

3,048,758
INVERSER TIMER MOTOR CONTROL
William Henry Comerford, Jr., Bellwood, and Harry Stuart Tice, Jr., Des Plaines, Ill., assignors to Controls Company of America, Schiller Park, Ill., a corporation of Delaware
Filed Feb. 29, 1960, Ser. No. 11,662
17 Claims. (Cl. 318—285)

This invention relates to a new and improved timer for washing machines or washer-dryer combinations, and particularly to means for controlling the direction of rotation of these devices.

The present invention is primarily concerned with washers of the type which rotate on a horizontal axis. In many of these devices, the motor drive is in one direction only while in others the direction of rotation is periodically reversed. The former approach is thought to produce twisting in the clothes, while in the latter, the clothes will be untwisted. Since the usual timer control provides a time interval longer than the period in which it is desirable to run in one direction, it is desirable to reverse rotation more frequently, that is, a number of times during each interval.

The primary object of this invention is to provide a timer for periodically reversing the direction of rotation of a motor at any desired frequency.

Various timing devices have been used in an effort to synchronize the reversing of the washer drive motor with the function intervals on the timer. These devices usually require complicated gearing to achieve synchronization and are driven by one of the gears in the timer motor gear train, increasing the load on the gear train requiring a more costly motor having greater torque.

Another object of this invention is to provide means for controlling the direction of rotation of the washer drive motor which can be added to the present timer without producing any substantial increase in the load on the gear train.

A further object of the present invention is to provide means for controlling the direction of rotation of the washer drive motor which is relatively simple in construction and economical to manufacture.

A still further object of the present invention is to provide means for controlling the direction of rotation of the washer drive motor that is synchronized automatically with the timer drive mechanism.

Other objects and advantages will be apparent from the specification and claims as will obvious modifications of the drawings, in which:

FIG. 1 is a side elevation of a tandem type timer.

FIG. 2 is taken on line 2—2 of FIG. 1 showing the yoke in a neutral position.

FIG. 3 is taken on line 3—3 of FIG. 1 showing the yoke system.

FIG. 4 is taken on line 4—4 of FIG. 1 showing both of the drive systems.

FIG. 5 is taken on line 5—5 of FIG. 4 showing a side elevation of the drive system.

FIG. 6 is taken on line 6—6 of FIG. 5 showing the drive system.

FIG. 7 is similar to FIG. 2 showing the yoke moved to the left.

FIG. 8 is similar to FIG. 7 showing the yoke moved to the right.

FIG. 9 is taken on line 9—9 of FIG. 5 showing the slow drop cam.

FIG. 12 is taken on line 12—12 showing the ratchet drive system.

FIG. 13 is a circuit diagram for a single phase induction motor with a start winding.

FIG. 14 is a circuit diagram for a single phase capacitor start motor.

FIG. 15 is a circuit diagram for a three phase motor.

Figure 10:
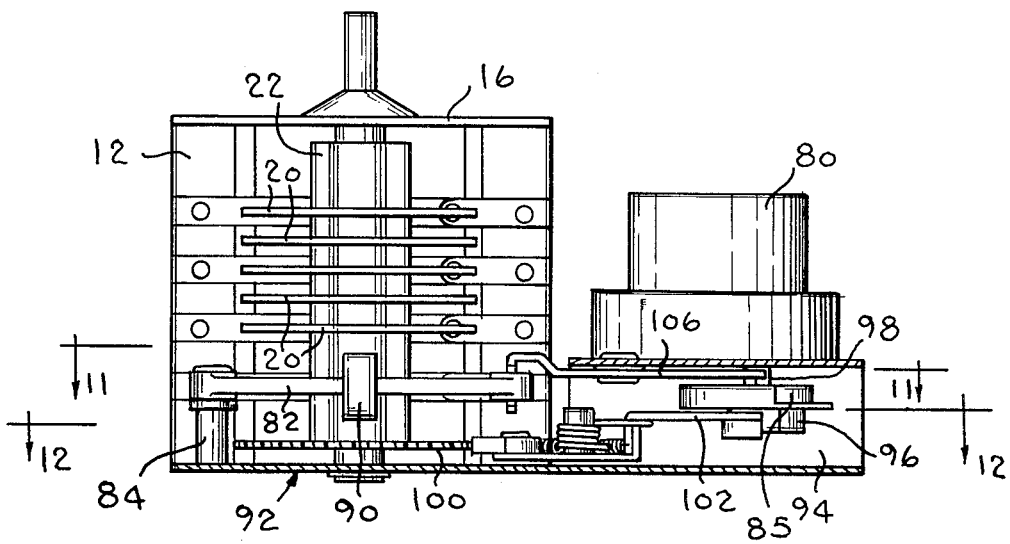
FIG. 10 is a side elevation in section showing a modified lateral type timer.

As seen in the drawings, the timer is of the basic interval type having a pair of terminal boards 10, 12 which carry program switches 14. The terminal boards are supported by end plates 16, 18 and the switches are provided with cam followers which act on cams 20 carried on arbor 22. The arbor is journaled in the end plates for rotation and carries drive ratchet 24, which is adapted to receive impulses from timer motor 26. A gear reduction is provided in the largest part of the timing motor to turn motor shaft 28 at a continuous rate of speed. The shaft carries molded disc 30, including slow drop cam 32 and reversing cam 34. The purpose of the slow drop cam is similar to that of the prior art, in that it gradually builds up energy in drive mechanism 36, and at its drop permits a rapid delivery of this energy through the drive to the arbor.

The drive mechanism includes lever 38 pivoted on post 40 and biased by spring 42 bearing against drive mounting bracket 44 and wound around the post to act against tab 46 (FIG. 4) to force the follower 48 into contact with the periphery of cam 32. Arm 50 is pivoted on lever 38 and biased by spring 52 so that finger 54, depending from arm 50 through hole 56 in end plate 18, will be held in contact with drive ratchet 24. As cam 32 rotates, lever 38 will rock in a counterclockwise direction slowly, and finger 54 will ride up the sloping portion of the next rearward tooth on the drive ratchet and shortly before the impulse is given to the lever, the finger will drop into the next tooth on the drive ratchet ready to advance the arbor on delivery of the power stroke. When the follower reaches the drop portion of the cam, the lever will rapidly rotate in a clockwise direction due to the bias of spring 42 advancing cams 20 to the next program interval. Pawl 58 is pivoted on end plate 18 and loaded by spring 60 into engagement with drive ratchet 24 to prevent reverse rotation of the arbor during the advancing motion of finger 54. This drive mechanism is customary in the prior art and is used to advance the arbor in a step-by-step manner, providing intervals of one to three minutes duration, depending on the r.p.m. of the motor shaft.

In the present invention, a novel switching arrangement is used to periodically reverse the washing machine motor during each interval of the washing cycle. As mentioned above, reversing cam 34 is provided on molded disc 30 on the opposite side of the disc from slow drop cam 32. The purpose of this cam is to actuate switches 62, 64 and 66 on terminal boards 10, 12 through drive mechanism 68 and thereby reverse the direction of current flow through portions of the circuits shown in FIGS. 13, 14 and 15 as described hereinafter.

The reversing switch drive mechanism includes lever 70 pivoted on post 72 on end plate 18 and having cam follower 74 positioned to engage cam 34. A T-shaped finger 76 is provided on the opposite end of the lever and extends through aperture 78 in the end plate 18 and engages slot 80 in yoke 82. The yoke is pivoted on post 84 and includes aperture 86 through which arbor 22 passes. A single switch actuator 88 is provided on one side of the yoke, and a double switch actuator 90 is provided on the other side of the yoke to operatively engage the cam followers provided on switches 62, 64 and 66. These switches are of the single pole, double throw type, having blades A, B and C and contacts A1, A2, B1, B2 and C1, C2. The blades A, B and C are made from flat leaf springs and are biased inwardly toward the cam arbor and engage actuators 88 and 90 on the yoke. The bias of the leaf spring for blade A is equal to the combined bias of the leaf springs in blades B and C, so that the yoke will be biased to a neutral or central position (FIG. 2) due to the equal forces being exerted on either side of the yoke with blades A, B and C disengaged from the contacts.

As cam 34 is rotated from the position shown in FIG. 4, cam follower 74 will engage the outside cam surface approximately shown at 35, rotating lever 70 in a clockwise direction to move the yoke to the left (FIG. 7) and hold it in this position for 24 seconds or 144 degrees of rotation of the cam. Blades B and C will be pushed into engagement with contacts B1 and C1, and blade A will follow the yoke, due to its own bias, closing contact A2. As the cam follower approaches the end of cam surface 35, the bias of blades B and C will push the yoke to a neutral position, rotating lever 70 counterclockwise, with cam follower 74 moving to a position spaced from cam surface 35. Blades A, B and C will then be disengaged from the contacts and all circuits will be open. Continued rotation of cam 34 will bring the inside cam surface (generally designated 37) into engagement with cam follower 74 to rotate lever 70 counterclockwise and move the yoke to the right (FIG. 8) to hold it in this position for 24 seconds or 144 degrees of rotation of the cam. The transfer of the cam follower from cam surface 35 to cam surface 37 will take approximately six seconds or 36 degrees of rotation of the cam. All of the switches for the motor will be open during this transfer period, allowing the washer drive motor to slow down. Blades A, B and C will then close with contacts A1, B2 and C2. When the cam follower reaches the end of cam surface 37, the bias of blade A will move the yoke to the left, rotating lever 70 and moving cam follower 74 again to a neutral position between cam surfaces 35 and 37. The cam shown is designed to close the switches for 24 seconds and open the switches for six seconds at a timing speed of one r.p.m. This cycle provides a single change in direction of rotation for the motor during each interval, but the cam can be varied to provide any number of reversals which would be compatible with the drive motor. The switches and yoke are designed so that switch 62 or blade A is closed last and opened first for either direction of movement of the yoke, to insure that switches 64 and 66 are fully closed before the line current is turned on or when the line current is turned off.

In washer-dryer combinations, the motor is usually driven in one direction during the spin and drying cycles. When the washing cycle is completed and the spin or drying cycle started, the reversing circuit is bypassed by the program switches as described hereinafter. It is important to have the motor off or rotating in the same direction at the end of the washing cycle as it will be rotating during the next cycle to prevent excessive surges in line current and in the case of a centrifugal switch start winding it is necessary to stop the motor before it can be reversed. This is accomplished by synchronizing cams 30 and 32 so that the drop portion of interval cam 32 is opposite the cam surface 35 or 37, or the neutral portion which follows these surfaces, so that the direction of rotation used last in the washing cycle will be the same as that used in the next cycle. Since the cams are back to back, this can be done when the cams are initially assembled.

Figure 11:
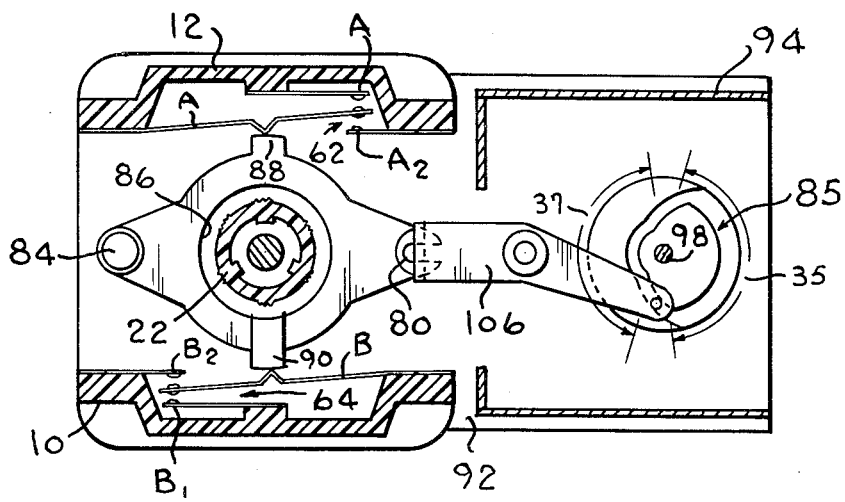
FIG. 11 is taken on line 11—11 of FIG. 10 showing the yoke drive system.

In the modified timer shown in FIGS. 10, 11 and 12, a more compact arrangement in terms of length is shown which has the timer motor 80 mounted laterally with respect to the arbor 22 and terminal boards 10, 12. End plate 18 is replaced by end plate 92 with the timer secured to the end plate on housing 94. The ratchet drive is similar to that described above with cam 96 rotating with motor shaft 98 to actuate drive ratchet 100 through drive lever 102. The yoke is oscillated as described above, with reversing cam 85 oscillating the yoke through lever 106 to actuate switches 62, 64 and 66.

FIGS. 13, 14 and 15 show the circuits commonly used for induction motors in washing machines. FIG. 13 shows a circuit for a single phase motor having a start winding which is considered the most complicated circuit in which reversing of the direction of rotation of the drive motor will be desired. This circuit requires three switches with blades B and C being reciprocated from B1, C1 to B2, C2 to reverse the current through the start winding. As explained above, blade A is not closed with A1 or A2 until blades B and C have been fully closed to prevent the flow of current through the run winding when there is no current flow through the start winding. This is more fully appreciated when it is realized that this type motor must be allowed to slow down before reversing is attempted and that a momentary surge of current through the run winding while the armature is still rotating will speed up the motor in the same direction as it was coasting. This accounts for the six second delay which is provided for in cam 34. This circuit is connected to program switches 110, 112 and 114, which are located on the terminal boards to be actuated by cams 20. Switches 112 and 114, when closed with contacts 124, 126 bypass reversing switches 64 and 66 to provide a unidirectional flow of current through the start winding when switch 110 is closed with contact 118. The washer motor will then run continuously in one direction. This is important in washers and washer-dryer combinations where one direction of rotation is generally used during the spin and drying cycles.

FIG. 14 shows a single phase capacitor start circuit with capacitor 72 connected across the windings 74, 76. Phase displacement is provided by the capacitor so that with A1 closed, clockwise rotation will be provided, and with A2 closed, counterclockwise rotation will be provided. This is the simplest circuit used with washer motors, and requires only a single program switch 128 on the terminal board to provide unidirectional rotation for the drying or spin cycle.

FIG. 15 shows a circuit for a three phase motor which can be operated by switches 64 and 66, but switch 62 is used to insure that all circuits are closed before the line current is turned on. Program switches 130, 132 and 134 are used to provide unidirectional rotation by opening contacts 136, 138 and 140 and closing contacts 142, 144 and 146 to bypass the reversing switches.

The timer described is not limited to the circuits shown, but may be readily adapted to any conventional motor circuit, thus providing a very versatile control. Although but two embodiments of the present invention have been shown and described, it will be apparent to those skilled in the art that changes and modifications may be made therein without departing from the spirit of the invention or from the scope of the appended claims.

We claim:

1. The combination with a sequence timer of the type having a plurality of function controlling switches operated by a cam bank driven at timing speed by a motor through a drive mechanism, including a member rotating at a speed greater than timing speed, the timing speed of the cam bank causing sequential operation of the switches at predetermined intervals, of means for providing additional functions during each interval comprising, a cam rotating with said member at a speed greater than the timing speed, oscillating means operated by and movable in a plane parallel to the plane of the cam, secondary switches operated by the oscillating means, and circuit means connecting certain of the switches controlled by the cam bank with the switches operated by the oscillating means so that the sequence of the switches operated by the oscillating means may be employed within an interval of the cam bank to provide additional functions during an interval.

2. The combination of claim 1 in which the drive mechanism imparts a step-by-step motion to the cam bank at spaced time intervals, and the member rotates continuously.

3. The combination of claim 2 in which the oscillating means includes a yoke having an orifice, which is concentric with the axis of the cam bank when in a neutral position, and is large enough to allow the yoke to rock to operative positions on either side of the cam bank.

4. A washing machine according to claim 3 wherein the secondary switches bias the yoke to a neutral position.

5. A washing machine including a drive motor having a cam bank driven through a drive mechanism by a timer motor in a step-by-step manner, with the cam bank operating function switches according to a prescribed sequence, said drive motor being connected in circuit with said function switches, a plurality of reversing switches, oscillating means driven by the drive mechanism to sequence the reversing switches through a predetermined cycle during each interval of the cam bank, said reversing switches being connected in the circuit including the drive motor and the function switches to control the rotation of the drive motor.

6. A washing machine according to claim 5 wherein the oscillating means includes a yoke concentric with the axis of the cam bank thereby defining a neutral position in which the drive motor circuits are open and pivoted to oscillate to operative positions on either side of the cam drum.

7. A washing machine according to claim 6 wherein the reversing switches bias the yoke to a neutral position.

8. An interval timer having a pair of terminal boards, interval switches and reversing switches mounted on the terminal boards, said reversing switches being connected to modify the circuits operated by the interval switches, an arbor positioned to rotate between the terminal boards, a number of cams rotatable with the arbor to actuate the interval switches, oscillating means movable in a plane transverse to the axis of the arbor and positioned to actuate the reversing switches, a timing motor operatively connected to advance the cam bank in a step-by-step manner and to oscillate the oscillating means through a predetermined cycle during each step of the cam bank.

9. A timer according to claim 8 wherein the oscillating means comprises a yoke pivoted to oscillate between the reversing switches, the reversing switches being biased to hold the yoke in a neutral position.

10. A timer according to claim 9 wherein the timing motor mounted in tandem with the arbor.

11. A timer according to claim 8 wherein the timing motor is positioned laterally to the arbor and the oscillating means is biased to a neutral position by the reversing switches.

12. In combination with a washing machine driven by a drive motor and controlled by an interval timer including a plurality of function switches sequentally operated by a cam bank driven at timing speed by a motor through a drive mechanism, said drive motor being connected in circuit with certain of the function switches, of means for periodically reversing the direction of rotation of the drive motor during each sequence of the function switches comprising, a plurality of reversing switches connected in circuit with the drive motor and the function switches, oscillating means movable in a plane transverse to the axis of the cam bank and operatively connected to actuate the reversing switches, said oscillating means being driven by the drive mechanism through a predetermined cycle to thereby reverse the direction of rotation of the drive motor a number of times during each sequence of the function switches.

13. The combination with a sequence timer of the type having a plurality of function controlling switches operated by a cam bank driven at timing speed by a motor through a drive mechanism, including a member rotating at a speed greater than timing speed, the timing speed of the cam bank causing sequential operation of the switches at predetermined intervals, of means for providing additional functions during certain intervals comprising, a number of reversing switches, means for actuating the reversing switches, means for translating the rotary motion of the rotating member of the drive mechanism into oscillatory motion in the actuating means, and circuit means including certain of the function switches and the reversing switches to increase the functions effected during each interval.

14. The combination according to claim 13 wherein the translating means includes a double surfaced cam in which the surfaces are alternately operative.

15. The combination according to claim 14 in which the means for actuating the reversing switches is inoperative during the transfer of the means for actuating the reversing switches from one surface of the double cam to the other.

16. The combination according to claim 5 wherein the oscillating means includes a double surfaced cam having one surface to control clockwise rotation of the drive motor, and the other surface to control counterclockwise rotation of the drive motor.

17. The combination according to claim 16 including a cam follower which rides in said surfaces alternately, said follower transferring from one surface to the other cyclically, and said reversing switches being open during the transfer.

References Cited in the file of this patent

UNITED STATES PATENTS

| | | |
|---|---|---|
| 2,656,424 | Frerer et al. | Oct. 20, 1953 |
| 2,703,347 | Constantine | Mar. 1, 1955 |